United States Patent
Ghisla et al.

(10) Patent No.: US 9,502,884 B2
(45) Date of Patent: Nov. 22, 2016

(54) METHODS AND SYSTEMS FOR PROTECTING DC CIRCUITS

(71) Applicant: University Of South Carolina, Columbia, SC (US)

(72) Inventors: Ugo Ghisla, Columbia, GA (US); Roger Dougal, Columbia, SC (US); Igor Kondratiev, Columbia, SC (US)

(73) Assignee: University of South Carolina, Columbia, SC (US)

( * ) Notice: Subject to any disclaimer, the term of this patent is extended or adjusted under 35 U.S.C. 154(b) by 111 days.

(21) Appl. No.: 14/461,347

(22) Filed: Aug. 15, 2014

(65) Prior Publication Data

US 2015/0103456 A1    Apr. 16, 2015

Related U.S. Application Data

(60) Provisional application No. 61/959,127, filed on Aug. 15, 2013.

(51) Int. Cl.
| | |
|---|---|
| *H02H 9/08* | (2006.01) |
| *H02H 3/38* | (2006.01) |
| *H02H 3/20* | (2006.01) |
| *H02M 3/158* | (2006.01) |
| *H02H 9/02* | (2006.01) |
| *H02M 1/32* | (2007.01) |
| *H02H 7/12* | (2006.01) |

(52) U.S. Cl.
CPC .............. *H02H 3/38* (2013.01); *H02H 3/20* (2013.01); *H02H 9/02* (2013.01); *H02M 3/1582* (2013.01); *H02H 7/1213* (2013.01); *H02H 9/025* (2013.01); *H02M 1/32* (2013.01)

(58) Field of Classification Search
USPC .......................................... 361/18, 93.7–93.9
See application file for complete search history.

(56) References Cited

U.S. PATENT DOCUMENTS

| | | | | |
|---|---|---|---|---|
| 6,166,527 | A * | 12/2000 | Dwelley | H02M 3/1582 323/222 |
| 2008/0164766 | A1* | 7/2008 | Adest | H02J 1/12 307/80 |
| 2009/0039852 | A1* | 2/2009 | Fishelov | H02M 3/157 323/283 |
| 2014/0117951 | A1* | 5/2014 | Dally | H02M 3/158 323/266 |
| 2015/0303803 | A1* | 10/2015 | Chen | H02M 3/158 323/271 |

* cited by examiner

*Primary Examiner* — Danny Nguyen
(74) *Attorney, Agent, or Firm* — McNair Law Firm, P.A.; Douglas L. Lineberry

(57) ABSTRACT

Methods and systems for protecting DC circuits are provided. In an aspect, a method for controlling at least one protection circuit is disclosed. The method can monitor one or more parameters of the at least one protection circuit. One or more control signals can be selectively provided to a plurality of switches in the at least one protection circuit based on one or more parameters of the at least one protection circuit, in order to implement the appropriate protective topology based on one or more parameters of the at least one protection circuit. The method can be used to control a plurality of switches in the protection circuit and protect the DC circuit against short circuit, instabilities, and bus outages, and the like.

10 Claims, 21 Drawing Sheets

METHODS AND SYSTEMS FOR PROTECTING DC CIRCUITS

CROSS REFERENCE TO RELATED PATENT APPLICATION

This application claims priority to U.S. Provisional Application No. 61/959,127 filed Aug. 15, 2013, herein incorporated by reference in its entirety.

STATEMENT OF GOVERNMENT FUNDING

This invention was made with government support under N00014-08-1-0080 awarded by Office of Naval Research. The government has certain rights in the invention.

BACKGROUND

DC systems offer many advantages over AC systems, such as a higher flexibility of power management, a higher performance, a better reconfigurability and power-flow controllability. Despite these advantages, common disturbances for DC systems, such as short circuits, power outages, and voltage sags, are major concerns for DC systems. Short circuits in DC systems are more dangerous and difficult to extinguish than in AC systems, because of their potentially higher currents. Voltage sags can also cause severe problems in DC systems. When voltage sags occur, constant power loads can cause a negative incremental impedance instability that can lead to system failure if not compensated. Cascading effect between short circuits and negative incremental impedance instabilities is another problem for DC systems. For example, a short circuit fault in one distribution line can induce voltage sags and cause negative incremental impedance instabilities in other circuits within a same zone. Thus, there is a need for more sophisticated methods and systems for protecting DC circuits.

SUMMARY

The disclosed methods and systems relate to methods for controlling protection circuits for DC distribution systems. In an aspect, the methods can implement a control algorithm. In an aspect, a method to control a protection circuit that guarantees multiple types of protection in DC distribution circuits is disclosed. In an aspect, a method for controlling at least one protection circuit is disclosed. The method can monitor one or more parameters of the at least one protection circuit. One or more control signals can be selectively provided to a plurality of switches in the at least one protection circuit based on one or more parameters of the at least one protection circuit, in order to implement the appropriate protective topology based on one or more parameters of the at least one protection circuit. The method can be used to control a plurality of switches in the protection circuit and protect the DC circuit against short circuit, instabilities, and bus outages, and the like. The at least one protection circuit can function as one or more switching converters, and wherein the at least one protection circuit can implement a buck function on an input side and implements a boost function on an output side. In an aspect, the one or more parameters can comprise one or more of input current, output voltage, input capacitor voltage, output capacitor voltage, output current, and inductor current of the at least one protection circuit.

In an aspect, the disclosed methods and systems can comprise an apparatus. The apparatus can comprise a protection circuit and a controller. The controller can be configured for selectively providing one or more control signals to the plurality switches in the protection circuit based on one or more parameters of the at least one protection circuit.

In an aspect, an example protection circuit can comprises a plurality of switches, wherein the plurality of switches can be five or more switches. A first switch can be connected between a positive input terminal of the at least one protection circuit and a positive input terminal of an input capacitor. A second switch can be connected between a positive terminal of an input capacitor and an input terminal of an inductor. A third switch can be connected between the input terminal of the inductor and a ground potential. A fourth switch can be connected between an output terminal of the inductor and the ground potential. A fifth switch can be connected between the output terminal of the inductor and an output terminal of the at least one protection circuit.

As an example, the at least one protection circuit can be connected between a DC distribution system and a load. As another example, the at least one protection circuit can be coupled between a main DC distribution system and a secondary DC distribution system, and the one or more control signals can be selectively provided to the first protection circuit and the second protection circuit independently.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
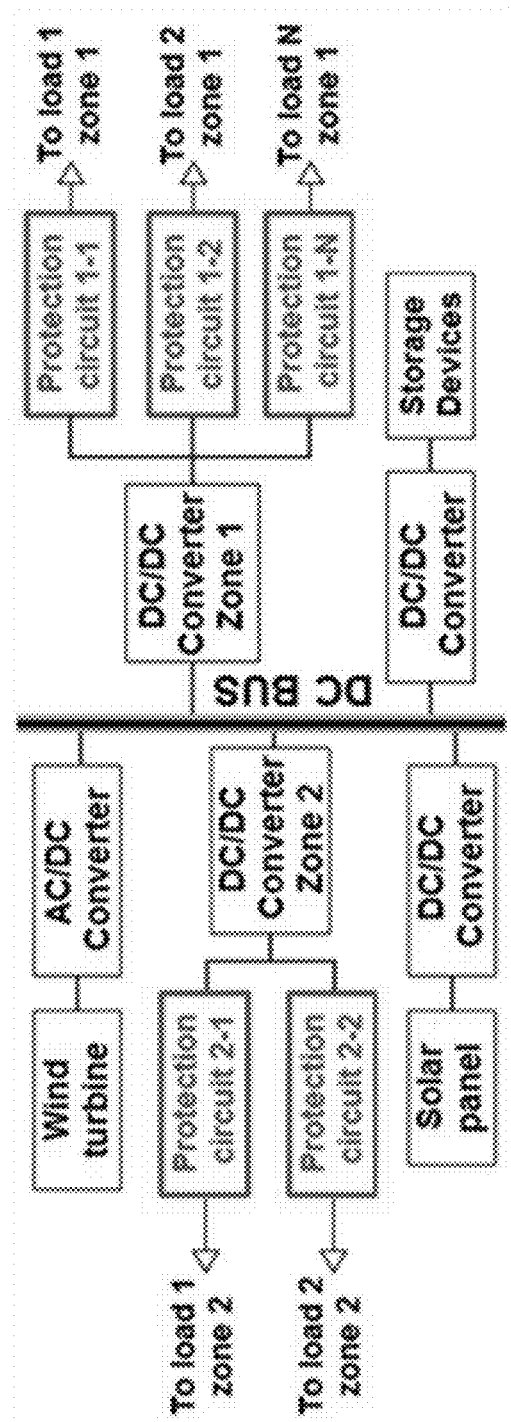
FIG. 1 is a block diagram illustrating an example implementation of the disclosed system.

Before the present methods and systems are disclosed and described, it is to be understood that the methods and systems are not limited to specific methods, specific components, or to particular configurations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

As will be appreciated by one skilled in the art, the methods and systems may take the form of combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices. For example, software can be installed in the hardware interface that is connected to protection circuit. The software can perform calculation for one or more control signals needed for the switch based on measurement acquired through a hardware interface. The hardware interface can translate calculation performed by the software to electrical signals which can then be used to drive a hardware device (e.g., the protection circuit).

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

In an aspect, a method to control a protection circuit that guarantees multiple types of protection in DC distribution circuits is disclosed. In an aspect, a method for controlling at least one protection circuit is disclosed. The method can monitor one or more parameters of the at least one protection circuit. One or more control signals can be selectively provided to the plurality of switches in the at least one protection circuit based on one or more parameters of the at least one protection circuit, in order to implement the appropriate protective topology based on one or more parameters of the at least one protection circuit. The method can be used to control a plurality of switches in the protection circuit and protect the DC circuit against short circuit, instabilities, and bus outages, and the like. The at least one protection circuit can function as one or more switching converters, and wherein the at least one protection circuit can implement a buck function on an input side and implements a boost function on an output side. In an aspect, the one or more parameters can comprise one or more of input current, output voltage, input capacitor voltage, output capacitor voltage, output current, and inductor current of the at least one protection circuit.

In an aspect, an example protection circuit can comprises a plurality of switches, wherein the plurality of switches can be five or more switches. A first switch can be connected between a positive input terminal of the at least one protection circuit and a positive input terminal of an input capacitor. A second switch can be connected between a positive terminal of an input capacitor and an input terminal of an inductor. A third switch can be connected between the input terminal of the inductor and a ground potential. A fourth switch can be connected between an output terminal of the inductor and the ground potential. A fifth switch can be connected between the output terminal of the inductor and an output terminal of the at least one protection circuit.

As an example, the at least one protection circuit can be connected between a DC distribution system and a load. As another example, the at least one protection circuit can be coupled between a main DC distribution system and a secondary DC distribution system, and the one or more control signals can be selectively provided to the first protection circuit and the second protection circuit independently. The method can be used to control a plurality of switches in the protection circuit and protect the DC circuit against short circuit, instabilities, and bus outages, and the like.

In an aspect, the plurality of switches can comprise power electronic switches, which can be fully or partially controllable. As an example, the plurality of switches can comprise MOSFETs, IGBTs, thyristors, and the like. The plurality of switches can be power electronic components through which appropriate control can be driven to behave as controlled switches.

In an aspect, the at least one protection circuit can further comprises one or more sensors configured to monitor the one or more parameters of the at least one protection circuit. The one or more parameters of the at least one protection circuit is obtained via one or more voltage sensors and one or more current sensors.

In an aspect, a method for a protection circuit is disclosed. The disclosed method can be used to control a protection circuit for protecting a DC circuit (e.g., a DC power distribution system) without modification of structure and control strategies of converters in the DC circuits (e.g., DC power distribution system).

In an aspect, one or more control signals can be provided to close the first switch, the second switch and the fifth switch, and open the third switch and the fourth switch when the input voltage, the input current, the output voltage, the output current, and the inductor current are within a respective predefined range.

In an aspect, one or more control signals can be provided to close the first switch and the fifth circuit, open the fourth switch, and switch the second switch and the third switch when the inductor current is outside a predefined range to in order to limit the inductor current to a predefined inductor current value.

In another aspect, one or more control signals can be provided to open the second switch and close the third switch in order to drive the inductor current to zero if the inductor current is beyond the predefined inductor current value for over a predefined period of time.

In another aspect, one or more control signals can be provided to open the first switch and the third switch, close the second switch, and switch the fourth switch and the fifth switch when the input voltage is below a predefined input voltage value and below the input capacitor voltage.

In another aspect, one or more control signals can be provided to open the first switch when the input voltage is below a predefined input voltage value but above the input capacitor voltage, and one or more control signal can be applied to the second switch, the third switch, the fourth switch, and the fifth switch based on the ratio of the input voltage and the input current. When the ratio of the input voltage and the input current is over a predefined value, one or more control signals can be further provided to close the second switch, open the third switch, and switch the fourth switch and the fifth switch. When the ratio of the input voltage and the input current is below a predefined value, one or more control signals can be provided to close the fifth switch, open the fourth switch, and switch the second switch and the third switch. In an aspect, one or more control signals can be further provided to open the second switch and close the third switch when the output capacitor voltage is below a predefined capacitor voltage value. In an aspect, one or more control signals can be further provided to open the second switch and close the third switch when the output capacitor voltage is below a predefined capacitor voltage value. In an aspect, one or more control signals can be further provided to open the second switch and close the third switch when one or more predefined maximum value associated with the controller is reached (e.g., the controller is saturated).

The disclosed methods and systems can improve efficacy of a controlled protection circuit in different operating modes. In an aspect, a method can effectively control a protection circuit to obtain quick fault extinction, therefore providing intervention and fault current limitation before fault current reach dangerously high values. For self extinguishing short circuits, the disclosed methods and systems can limit fault current and automatically return to a normal operation after the fault current is extinguished. Thus, a manual reconnection can be eliminated. The disclosed methods and systems can also eliminate fault influence on healthy lines connected to the same DC distribution system. In another aspect, the disclosed methods and systems can increase quality of service during upstream faults (e.g., bus outages). This method can drive a protection circuit by, for example, actively control the charge and discharge of one or more capacitors in the protection circuit, permitting an optimization of the capacitor performance and therefore requiring a capacitor size smaller than the capacitor size would be required in a passive solution (e.g., use of a decoupling diode and holdup capacitor), thereby reducing weight, size and cost of capacitors. In case of voltage sags that would cause negative incremental impedance instability in an unprotected system, the disclosed methods and systems can effectively reduce and eliminate the instabilities by controlling the protection circuit to compensate for voltage sags within design limits and to temporarily disconnect constant power loads for voltage sags bigger than design limits.

FIG. 1 is a diagram of an implementation of the disclosed system. As an example, a plurality of protection circuits controlled with the disclosed method (e.g., protection circuit 1-1, protection circuit 1-2, protection circuit 1-N, protection circuit 2-1, and protection circuit 2-2) can be connected to a DC power distribution system. Specifically, the plurality of protection circuits can be placed between a plurality of converters connected to a DC bus and a plurality of loads (e.g., load 1 at zone 1, load 2 at zone 1, load N at zone 1, load 1 at zone 2, load 2 at zone 2, etc.).

Figure 2:
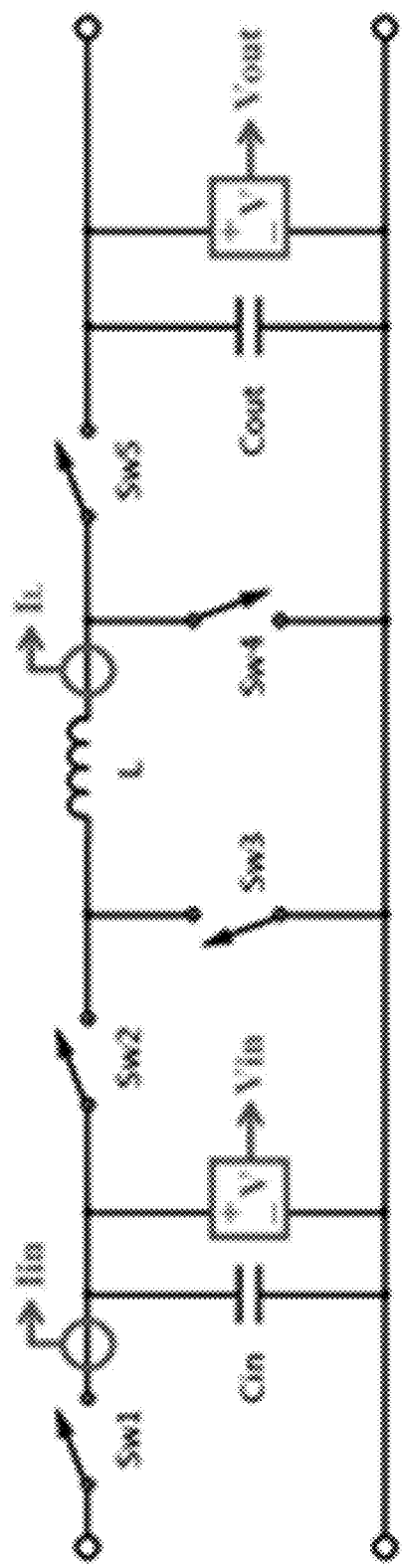
FIG. 2 illustrates an example protection circuit that can be controlled by the disclosed method.

FIG. 2 is a diagram of an example protection circuit that can be controlled with the disclosed method. The protection circuit shown in FIG. 2 can be configured to receive an input voltage $V_{in}$ and to provide an output voltage $V_{out}$.

The protection circuit shown in FIG. 2 can functions as one or more switching converters, and wherein the at least one protection circuit comprises a decoupling switch, an input capacitor, a buck converter, and a boost converter connected in cascade, wherein the decoupling switch is a first switch Sw1, the input capacitor $C_{in}$ is coupled across an input terminal of the at least one protection circuit and a ground potential, and wherein the buck converter comprise a second switch Sw2 connected to a inductor L, a third switch Sw3 coupled across between the ground potential and a connection point between the second switch Sw2 and the inductor L, and wherein the boost converter comprises the inductor L, a fourth switch Sw4, a fifth switch Sw5 and an output capacitor $C_{out}$, wherein the fifth switch Sw5 can be connected between the inductor L and an output terminal of the at least one protection circuit, and wherein the fourth switch Sw4 can be coupled across the ground potential and a connection point between the inductor L and the fifth switch Sw5, and wherein the output capacitor $C_{out}$ can be coupled between the output terminal of the at least one protection circuit and the ground potential In an aspect, switch positions of the five switches Sw1, Sw2, Sw3, Sw4, and Sw5 are static except when operating in protecting mode. During a normal operation, a controller can monitor one or more parameters (e.g., input and output voltage, input current, inductor current) of the protection circuit. When the controller detects an anomaly, it can implement an appropriate protective configuration. When working in protective mode, a method can control the protection circuit to implement a plurality of protections.

In an aspect, a protection against short circuit on a load side can be achieved, for example, by limiting and extinguishing fault currents. When an overcurrent is detected, the controller can limit output current to a preselected value. If the fault doesn't self extinguish within a predefined time $T_{lim}$, the controller can drive the output current to zero, then disconnect the faulted line. The time limit $T_{lim}$ can be set to be variable based on severity of fault. In another aspect, a protection against a brief power outage can be achieved, for example, by working as an energy buffer, using energy accumulated in the input capacitor to feed the load at constant voltage. In another aspect, a protection against negative incremental impedance instabilities can be achieved, for example, by keeping the equivalent resistance seen at the terminals of the protection circuit constant during voltage sags 0.

In an aspect, protection against short circuits can be achieved in each distribution line, eliminating a need for intervention at higher level (e.g., main converter), hence reducing fault influence on the healthy lines of a same zone. A DC circuit breaker can be eliminated. In another aspect, the disclosed methods and systems can distinguish between temporary and permanent faults and does not require manual reconnection. In yet another aspect, the disclosed methods and systems can limit fault energy, simplify fault de-energizing and faulty lines disconnection.

In an aspect, the disclosed methods can comprise a plurality of protection circuits, and each of the plurality of circuits can be independently controlled, and the appropriate protection mode can actuate automatically by a local controller based on local measurements, without the need of communication with the rest of the system, therefore providing good performance and less risk of interference in cases of simultaneous events.

An intrinsic selectivity of protection can be implemented in case a plurality of protection circuits are used at a plurality of levels (e.g., two or more levels) of a DC distribution circuit. In case of downstream fault, a downstream protection circuit can limit output current, causing input current to drop below a nominal value. Therefore, from an upstream system perspective, the downstream fault can behave like a load decrease, and an upstream protection can be unaffected.

The disclosed methods and systems can be suitable for control of electronic protection circuits in DC distribution systems at any power level, for example, for systems above kW level, including industrial power systems, electric vehicles (e.g., ships, trains, planes, cars, etc.), local-area DC micro-grids, and the like.

In one aspect, the disclosed methods and systems can be used for protection of DC distribution systems characterized by multiple distribution lines, especially if some of these distribution lines require uninterruptible power. For example, when a power converter supplies energy to a plurality of sections of a system through a plurality of distribution lines, each distribution line can be provided with a protection circuit controlled by the disclosed method. In case a fault is detected in a specific distribution line, only the affected distribution line is disconnected, allowing healthy distribution lines to keep operation in their normal operation mode.

In another aspect, the disclosed methods and systems can be used for protection batteries against downstream short circuit in a battery powered DC distribution systems (e.g., hybrid electric cars DC power distribution system). Currently, most battery powered DC distribution system is protected with fuses, which have to be replaced after each intervention. Substituting those fuses with a protection circuit controlled with the disclosed method can eliminate replacing components after each intervention. In addition, the disclosed methods and systems can distinguish short circuit from overloads, avoiding unwanted disconnection in case of temporary overloads.

In another aspect, the disclosed methods and system can be used for renewable energy powered DC circuits, for example, photovoltaic panels generated DC currents. The disclosed method can be used to control a protection circuit that works as protective interface between photovoltaic panels and DC grids.

Figure 3:
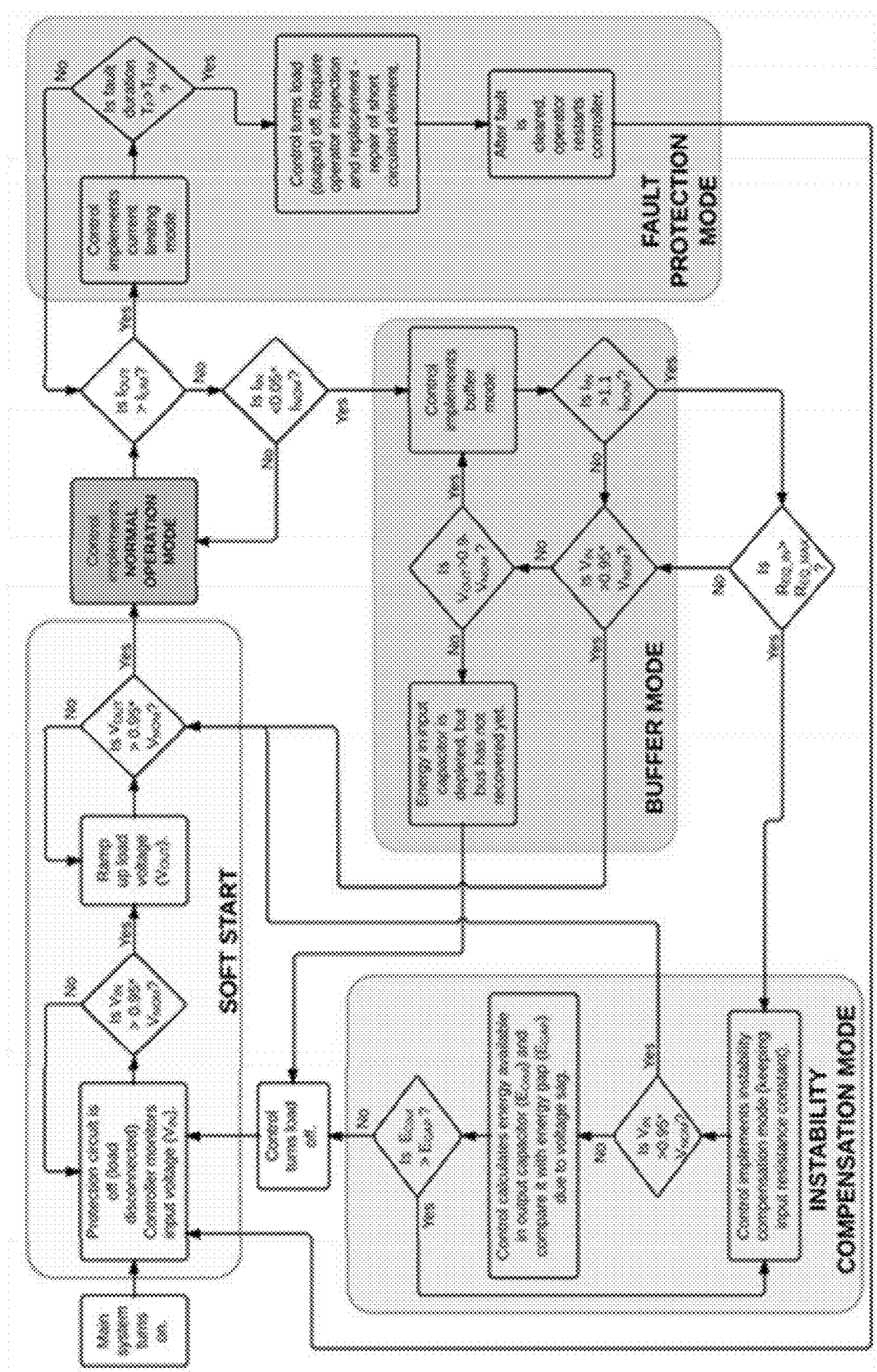
FIG. 3 illustrates a flowchart of the disclosed method.

FIG. 3 illustrates flowchart of the disclosed method. Specifically, FIG. 3 summarizes details of anomaly detection and respective protection circuit configuration based on each anomaly. In an aspect, a method can enable the protection circuit to operate in four operating modes: three protective operating mode and one for normal operating mode.

At normal operating mode, no switching occurs. Consequent switching losses can be zero. Specifically, Switches Sw1, Sw2 and Sw5 can remain closed and switches Sw3 and Sw4 can remain open. The controller can monitor anomalies in input voltage and input current, the current through the inductor L, and the output voltage. When an anomaly is detected, the controller transitions to an appropriate protection mode.

At load-side short circuit fault mode, switches Sw1 and Sw5 can be closed, and switches Sw2 and Sw3 can operate in a switching mode, and switch Sw4 can remain open. The controller can drive the protection circuit as a buck converter with variable duty cycle, limiting inductor current to a preset value. If the fault does not drop below a limiting value in a selected time ($T_{lim}$), the controller can assume the presence of a hard fault and drive the inductor current to zero. Fault detection can be implemented in different ways, from simply determining that current exceeds a preset limit, to more sophisticated approaches that rely on injection of AC probe currents 0 or analysis of the background noise in a system 0. Once the protection circuit performs in a current limiting mode, output voltage can be measured and used to distinguish between low resistance short-circuit and overloads, and this can be used to select different $T_{lim}$ for different fault topologies. For example, $T_{lim}$ can be longer for overloads and shorter for short circuit. During low resistance short circuit, fault power and energy can be significantly smaller that the power and energy during normal operation and overload, therefore, system upstream can be unaffected even if the short circuit is not immediately cleared. The control objective for this mode is shown in Equation (1). The dynamic model of the system in this configuration is shown in Equation (2), (3).

$$\begin{cases} i_L = const & \text{for } t \le T_{lim} \\ i_L \to 0 & \text{for } t > T_{lim} \end{cases} \quad (1)$$

$$\frac{di_L}{dt} = +\frac{V_{in}}{L}D - \frac{V_{out}}{L} \quad (2)$$

$$\frac{dV_{out}}{dt} = \frac{i_L}{C_{out}} - \frac{P}{C_{out}(V_{out})} \quad (3)$$

Where:
$i_L$ is the inductor current;
$T_{lim}$ is a preselected time to remain in current limiting mode before transitioning to extinction mode (in order not to disconnect lines during temporary overloads).
$V_{in}$ is the voltage on the input side of the circuit;
$V_{out}$ is the voltage on the output side of the circuit;
P is the power drawn by the load:
$C_{out}$ is the output capacitance of the circuit.
D is the duty cycle of the controlled switch.

At energy buffer mode, Switches Sw1 and Sw3 can be open, switch Sw2 can be closed, and switches Sw4 and Sw5 can operate in switching mode driven by the controller. During bus outages, the controller can drive the protection circuit as a boost converter with variable duty cycle, using energy accumulated in the input capacitor to feed the load. An input switch (e.g., first switch Sw1) can disconnect the protection circuit from power bus, preventing the input capacitor from discharging through the bus. Load sustaining time can depend on size of the input capacitor and on power required by the load. The dynamic model of the system in this configuration is shown in Equations (4), (5), and (6).

$$\frac{dV_{in}}{dt} = \frac{i_L}{C_{in}} \quad (4)$$

$$\frac{di_L}{dt} = \frac{V_{in}}{L} - \frac{V_{out}}{L}D \quad (5)$$

$$\frac{dV_{out}}{dt} = \frac{i_L}{C_{out}}D - \frac{P}{C_{out}(V_{out})} \quad (6)$$

At negative incremental impedance instabilities compensation mode, Sw1 can be open or closed, depending on the differential voltage between a DC bus and the input capacitor. When Sw1 is open, the protection circuit can operate as energy buffer. When Sw1 is closed, the controller can drive the protection circuit to work as an impedance transformer. Based on a difference between a desired equivalent input resistance and an actual load resistance, the controller can drive one or more of the five switches in two ways:

1. Switch Sw2 can be closed, switch Sw3 can be open, and switches Sw4 and Sw5 can operate in switching mode; and
2. Switch Sw5 can be closed; switches Sw2 and Sw3 can operate in switching mode, and switch Sw4 can be open.

The control objective for this configuration is to keep an equivalent input resistance constant, as shown in Equation (7). Equations (8), (9), (10) show the dynamic model of the converter in this configuration.

$$R_i = const \tag{7}$$

$$\frac{dE(t)}{dt} = \frac{V_S^2 \cdot R_i}{(R_S + R_i)^2} - P \tag{8}$$

$$\frac{dR_i(t)}{dt} = u \tag{9}$$

$$E(0) = \frac{C_{in} \cdot V_{in}^2}{2} \tag{10}$$

Where:
$R_i$ is the equivalent input resistance of the circuit;
$R_S$ is the equivalent source resistance;
E is the energy available at the input of the protection circuit during the voltage sag;
u is the control variable 0.

In case of voltage sags, the input switch (e.g., first switch Sw1) can disconnect the protection circuit from a DC bus, and the protection circuit can works in energy buffer mode. When voltage on the input capacitor drops below a bus voltage, the input switch can start conducting again. At this point, the controller can implement compensation against negative incremental impedance instabilities. The protection circuit can be driven by the controller as an impedance transformer, keeping its equivalent input resistance constant while using the energy accumulated in a load capacitor (e.g., output capacitor $C_{out}$) to make up energy deficiency to the load. In this scenario, from a system perspective, the combination of load and protection circuit can behave like a constant resistance, eliminating the negative incremental impedance instability. In an aspect, the input capacitor and the output capacitor can be properly sized to have enough accumulated energy to supply the energy deficiency during the disruption. Detailed considerations about capacitor sizing have been presented in work 0. To summarize, depending on common duration and entity of voltage sags expected in the DC bus, proper capacitor size can be calculated using Equation (11). It should be noted that even when voltage sags exceed these design limits, a system equipped with the protection circuits does not experience instabilities, because the protection circuit can disconnect a constant power load before it causes any instability, and can reconnect the constant power after the bus voltage has recovered.

$$C = \frac{8}{3} \cdot \frac{P_N}{V_N^2} \cdot \left(1 - \frac{V_i^2}{V_N^2}\right) \cdot t, \tag{11}$$

Where:
t is the maximum disruption duration to be protected;
$V_i$ is the minimum source voltage during disruption;
$V_N$ is the nominal system voltage;
$P_N$ is the nominal power of the constant power load.

Since the protection circuit operates in switching mode only intermittently (e.g., only in protective mode), switching losses can be therefore neglected. In an aspect, switching frequency can be increased to the MHz level, and total losses in normal losses can still be contained.

Figure 4:
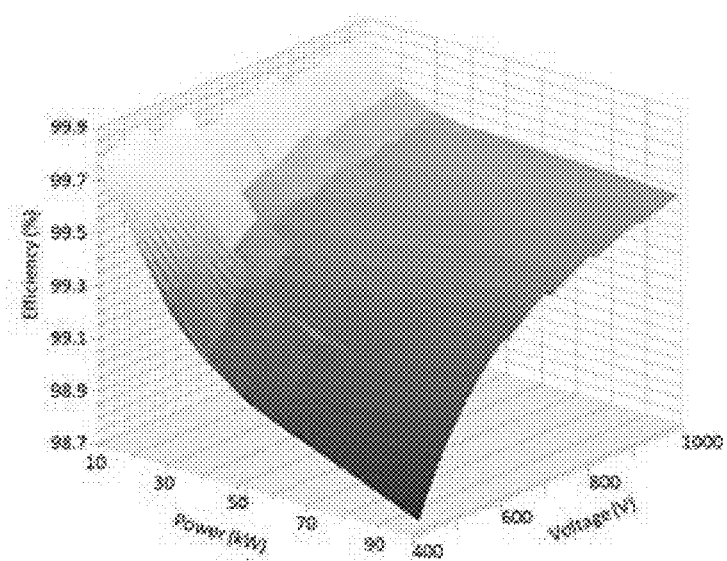
FIG. 4 illustrates efficiency of a protection circuit in a normal operating mode for voltage range between 400 and 1000V and power range between 10 kW and 100 KW.

FIG. 4 illustrates efficiency of a protection circuit in a normal operating mode for voltage range between 400 and 1000V and power range between 10 kW and 100 KW. Other voltage ranges and power ranges can be used.

The efficiency can be very high throughout the considered voltage and power ranges. The lowest efficiency ($\eta > 0.987$) can be around the minimum voltage–maximum power point, where the current is maximum. The efficiency increase at a higher voltage approaching a maximum efficiency near $\eta = 0.9985$.

Figure 5:
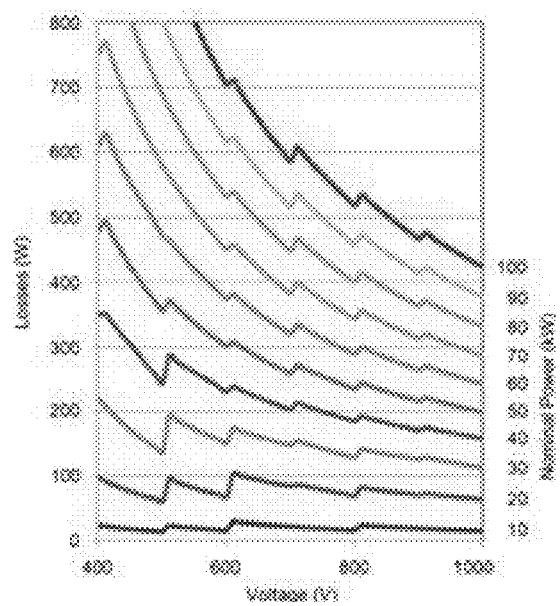
FIG. 5 illustrates total maximum losses in a protection circuit at a normal operation.

A maximum total loss of the protection circuit 100 can be calculated, including the losses in the inductor, for the voltage range of 400V-1000V and a power range of 10 kW-100 kW. These total losses are shown in Error! Reference source not found. At each power level, loss characteristic can be a composite of quasi-quadratic curves because losses are a combination of quadratic terms (e.g., MOSFETs on state resistance, inductor resistance) and linear terms (e.g., diode with constant voltage drop). The step-wise behavior of each characteristic can arise when a component having a higher rated voltage is selected, which can have a higher voltage drop or higher on state resistance. FIG. 5 shows that for 10 kW circuit capacity, the losses are small ($12 \text{ W} \leq P \leq 30 \text{ W}$) at every voltage level. At a higher power, a lower voltage loss can be more significant.

Figure 6:
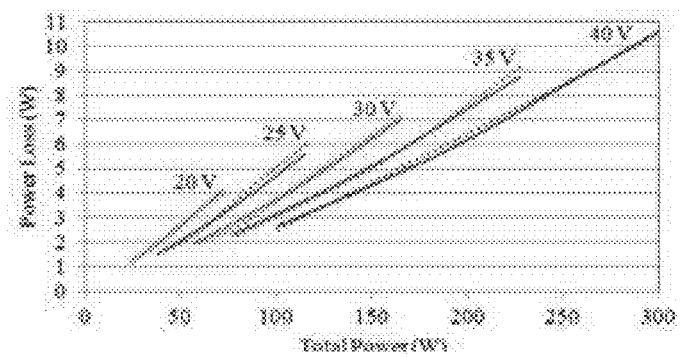
FIG. 6 illustrates a comparison between losses calculated from parametric study (solid line) and losses measured from a prototype (dotted line)

FIG. 6 illustrates a comparison between losses calculated from a parametric study (solid line) and losses measured from a prototype (dotted line). The results show that the difference between calculated and measured losses is very small (average error is 0.0027%). The comparison can facilitate to determine a maximum generated heat in the worst case scenario. In an aspect, losses can be calculated in case of a load with different possible load distributions. For example, for a selected load distribution, losses generated on the protection circuit at each power level can be calculated according to Equation (12). The equation is:

$$P_{AV} = \sum_{i=1}^{n} (P_{SW1i} + P_{SW2i} + P_{SW5i} + P_{Li}) \cdot \frac{t_i}{T} \tag{12}$$

Where:
$P_{AV}$ is the total average losses in the protection circuit for the selected load distribution;
i are the power levels of the load distribution;
n is the number of intervals in which the load distribution is divided;
$P_{SW1i}$, $P_{SW2i}$, $P_{SW3i}$, are the losses in each switch;
$P_{Li}$ are the losses in the inductor,
$t_i$ is the time for which the load is at each power level;
T is the total time.

Figure 7:
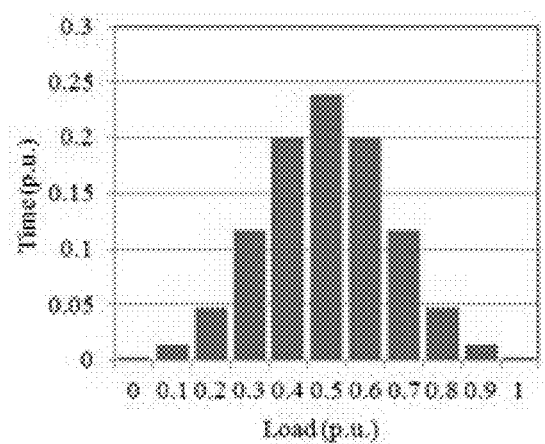
FIG. 7 illustrates an example normal load distribution used in average losses calculation.
Figure 8:
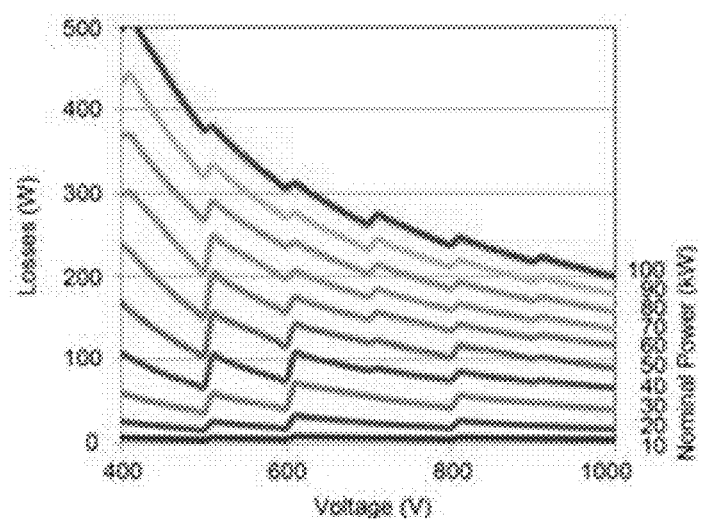
FIG. 8 illustrates average losses in protection circuit based on voltage and power levels for a load distribution.

FIG. 7 illustrates an example normal load distribution used in average losses calculation. The normal load distribution can be a discrete approximation of a Gaussian distribution. This distribution as being chosen as representative load because, as explained in 0. All load distributions can be appropriately modeled using a correctly tuned Gaussian curve. Specifically, the load distribution selected can be a discrete approximation of a Gaussian distribution with m=0.5 p.u. and σ=(0.5/3), which is an approximation of the sinusoidal profile presented in 0. FIG. 8 illustrates average losses in the protection circuit 100 based on voltage and power levels for a load distribution. With this load distribution, the average losses that would appear in the real system are substantially lower than the maximum losses shown in 0

For the hardware validation, A hardware test bed is used to reproduces in small scale a Simulink model used in simulations, and repeated the test previously performed in simulation and presented in 0. The parameters of the hardware test bed are in Error! Reference source not found.

| Variable | Value |
|---|---|
| $V_{bus}$ | 40 V |
| $I_{bus}$ | 10 A |
| $L_{bus}$ | 1 μH |
| $R_{bus}$ | 10 mΩ |
| $P_1$ (constant power load) | 250 W |
| $R_{load\ 2}$ | 10 Ω |
| $R_{fault}$ | 0 Ω-0.2 Ω-0.8 Ω-1.2 Ω-2 Ω-3.5 Ω-5 Ω-7 Ω |
| $I_{S\ max}$ (current limit upstream converter) | 15 A |

Using the experimental test bed, several fault scenarios for an unprotected and a protected system are tested and compared. For the comparison, the unprotected system is considered to be a system with the protection circuit in place but with all switching actions suppressed; practically, this is equivalent to having a holdup capacitor with a decoupling diode placed in line with each distribution line, which is a common configuration for protection against sags and DC power outages). The choice was made in order to have a fair comparison between two systems equipped with the same amount of holdup capacitance.

Figure 9:
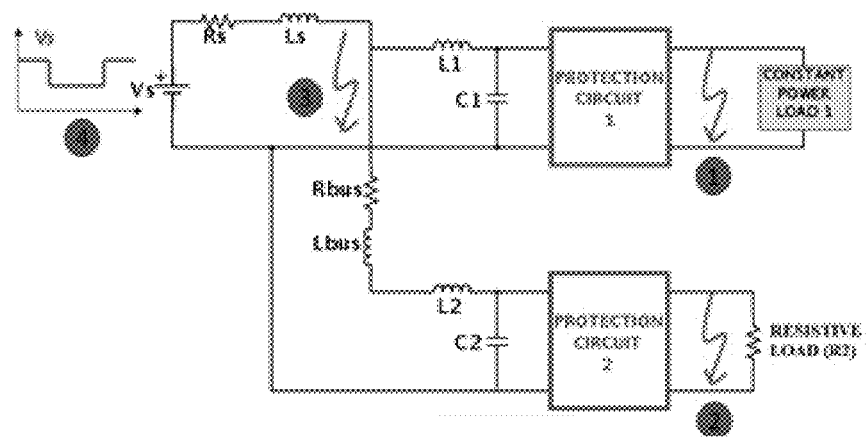
FIG. 9 illustrates a plurality of fault scenarios.

FIG. 9 illustrates a plurality of fault scenarios. The plurality of fault scenarios are the following:

For short circuit fault on load 1 (number 1 in FIG. 9), effect on the current in the faulty line and on the voltage of bus and of healthy zones is analyzed.

For short circuit fault on load 2 (number 2 in FIG. 9), effect of the fault on the current in the faulty line and on the voltage of bus and of the healthy line equipped with a constant power load is analyzed.

For DC bus outage (number 3 in FIG. 9), sustainment time of loads during bus outage is analyzed.

For voltage transient on DC bus (number 4 in FIG. 9), effect of transient on a constant power loads and its repercussion on the DC bus is analyzed.

Short-Circuit on Load Side

Figure 10A:
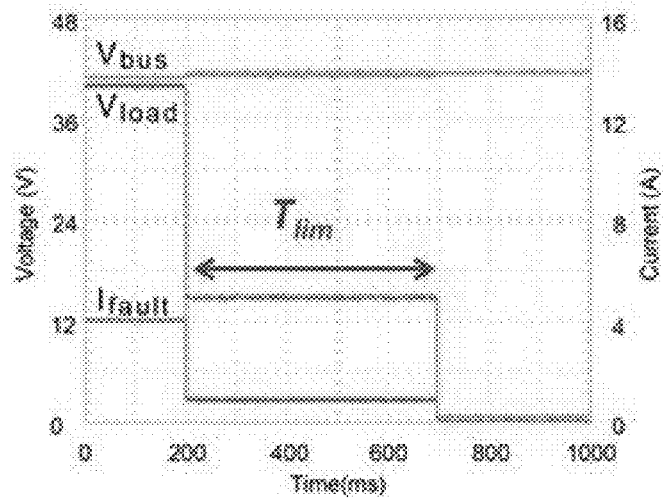
FIG. 10A illustrates a fault current, a bus voltage, and a load voltage for a permanent fault in method to control a protection circuit that guarantees multiple types of protection in DC distribution circuits.
Figure 10B:
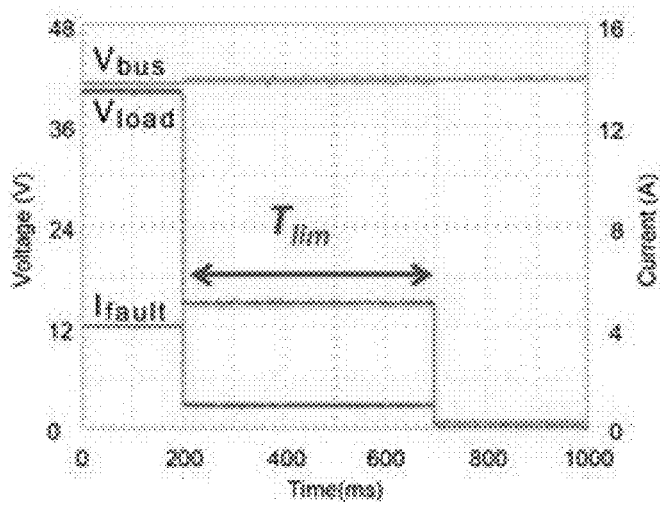
FIG. 10B illustrates a fault current, a bus voltage, and a load voltage for a permanent fault in an unprotected system.

FIG. 10A and FIG. 10B show a comparison between behavior of a protected and an unprotected system during a permanent fault (short circuit) on line 1 (fault 1 in FIG. 9). Specifically, FIG. 10A illustrates a fault current, a bus voltage, and a load voltage for a permanent fault in a protected system. FIG. 10B illustrates a fault current, a bus voltage, and a load voltage for a permanent fault in an unprotected system.

Figure 11:
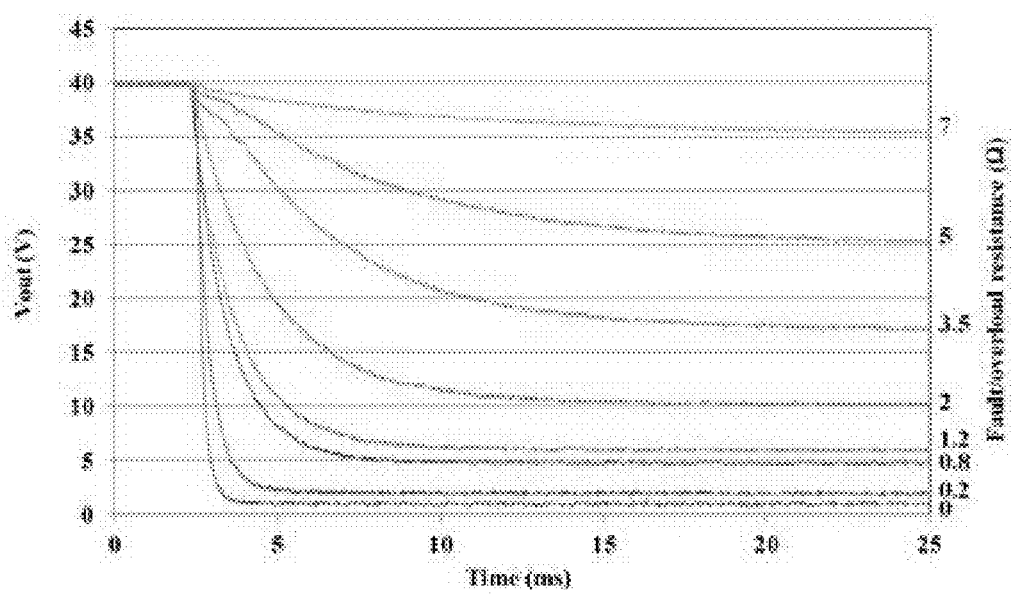
FIG. 11 illustrates an output voltage in a protected system for different fault magnitude.

In the protected system, as illustrated in FIG. 10A, during a short circuit, a protection circuit can limit fault current to a pre-selected value (120% of the nominal current). When the fault does not self-extinguish within a selected time $T_{lim}$ (e.g., 500 ms), a controller can drive the fault current to zero, extinguishing the fault. Bus voltage is basically unaffected. Load voltage on the faulty line can rapidly decrease to a value of the fault resistance multiplied by the current limit value. At this point, energy dissipated in the fault is smaller than the energy originally dissipated in the load. FIG. 11 illustrates an output voltage in a protected system for different fault magnitude. Different fault magnitudes can lead to different output voltages, as shown in FIG. 11. This can be used by a controller which constantly monitors output voltage to distinguish between short circuits and overloads, permitting the selection of different $T_{lim}$ for different fault magnitudes, therefore allowing longer time for overloads while quickly disconnecting low resistance short circuits.

Figure 12A:
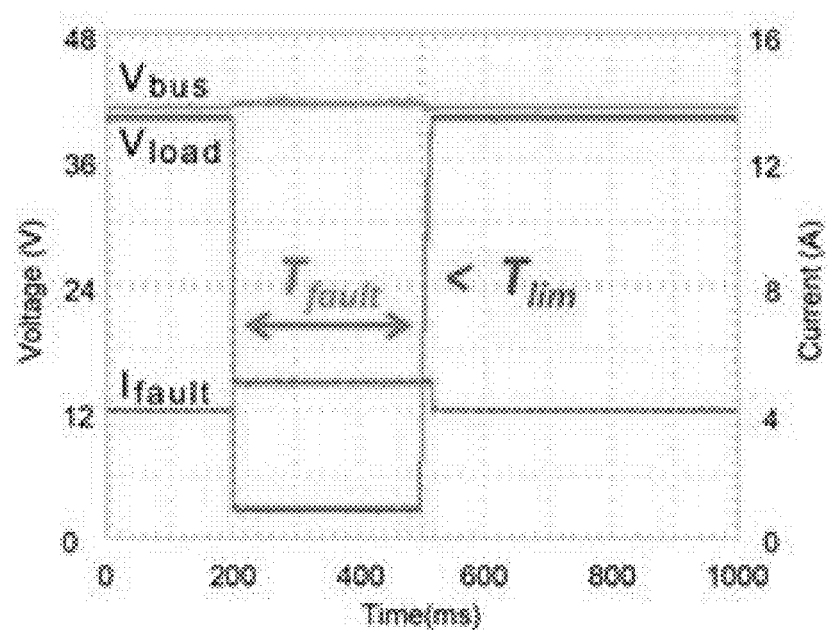
FIG. 12A illustrates a fault current, a bus voltage, and a load voltage for a self extinguishing fault in a protected system.
Figure 12B:
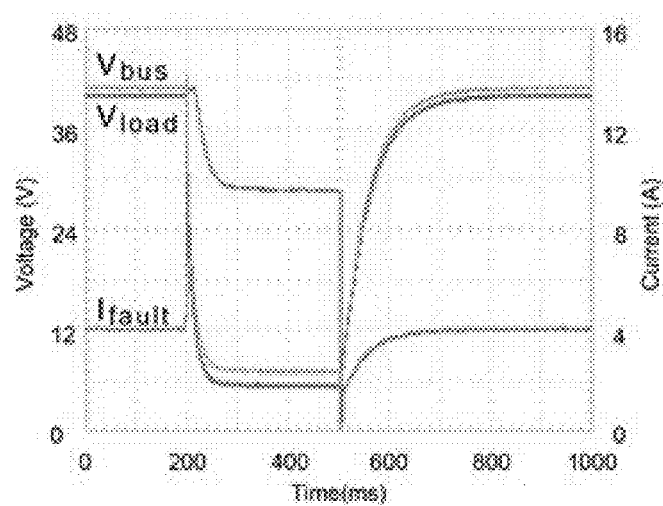
FIG. 12B illustrates a fault current, a bus voltage, and a load voltage for a self extinguishing fault in an unprotected system.

In the unprotected system, as illustrated in FIG. 10B, fault current can rapidly increase above current limit value of an upstream converter, the upstream converter can go into current limiting mode, causing a drop in bus voltage. FIG. 12A and FIG. 12B show the effect of a short circuit that self-extinguishes before the selected time $T_{lim}$. Specifically, FIG. 12A illustrates a fault current, a bus voltage, and a load voltage for a self extinguishing fault in a protected system; FIG. 12B illustrates a fault current, a bus voltage, and a load voltage for a self extinguishing fault in an unprotected system.

In the protected system, shown in FIG. 12A, the fault current is limited; when the fault self-extinguishes, output current and voltage return to their nominal values (e.g., normal operation). The voltage on the bus is unaffected, and power continuity in healthy lines is ensured. In the unprotected system, shown in FIG. 12B, current rapidly increases, an upstream converter goes in current limiting mode, and the bus voltage drops. When the fault self-extinguishes, bus voltage goes back to its nominal value. Although for a temporary fault in the unprotected system the system recovers after the fault self-extinguishes, the fault still causes a relevant voltage drop in the DC bus. If constant power loads are connected to the bus, it can cause a negative incremental impedance instability and system failure.

Figure 13A:
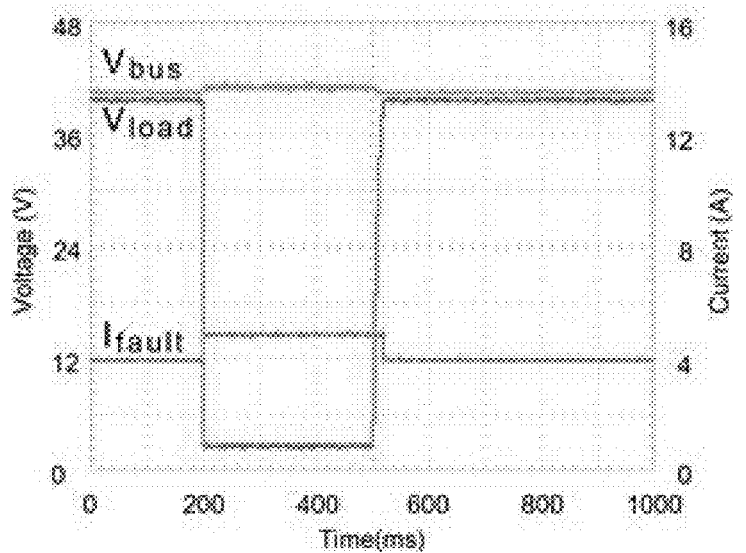
FIG. 13A illustrates a fault current, a bus voltage, and a load voltage for self-extinguishing fault in a protected system.
Figure 13B:
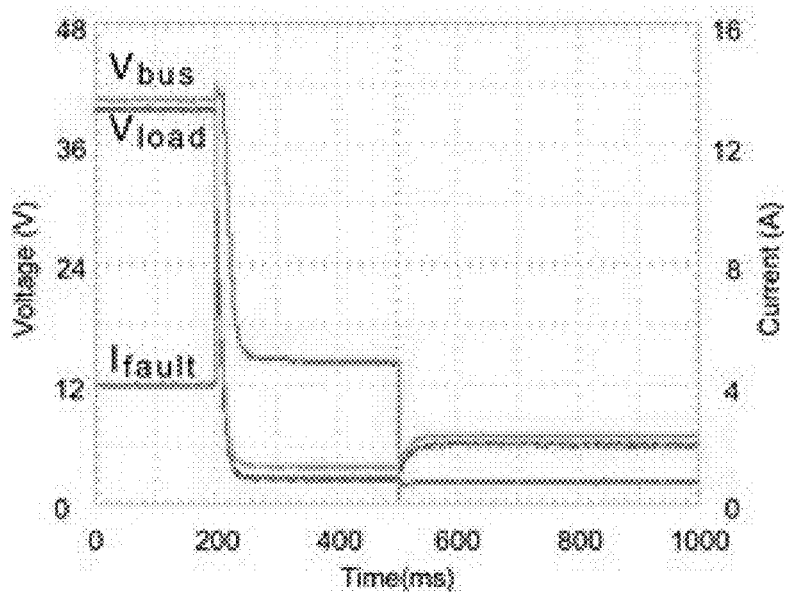
FIG. 13B illustrates a fault current, a bus voltage, and a load voltage for a self-extinguishing fault in an unprotected system.

FIG. 13 shows the behavior of the protected and unprotected system during short circuit on line 2 (fault number 2 in FIG. 9) for a case of a permanent fault. In this case, a constant power load is connected to the healthy zone. FIG. 13A illustrates a fault current, a bus voltage, and a load voltage for self-extinguishing fault in a protected system. FIG. 13B illustrates a fault current, a bus voltage, and a load voltage for a self-extinguishing fault in an unprotected system.

It can be seen that even for a case with a constant power load connected to a healthy line in the protected system, shown in FIG. 13A, the behavior of the upstream system is still unaffected by the fault. This demonstrates that for the protected system, in case of fault in one of the protected lines, the rest of the system is unaffected, independently from the configuration of the system and from type of loads connected to the healthy lines.

In the unprotected system, as shown in FIG. 13B, the current rapidly increases until the upstream converter goes into current limiting mode; the voltage on the bus drops, causing the current in the healthy zone (connected to the constant power load) to increase. This causes an even bigger voltage drop in the dc bus compared to the case with resistive load on the healthy line. When the fault extinguishes, the voltage on the bus is so low that the current required by the constant power load connected to the healthy zone is higher than the current limit in the upstream converter. Consequently, the DC bus voltage doesn't recover, causing a complete system failure.

Energy Buffer During DC Bus Outage

Figure 14A:
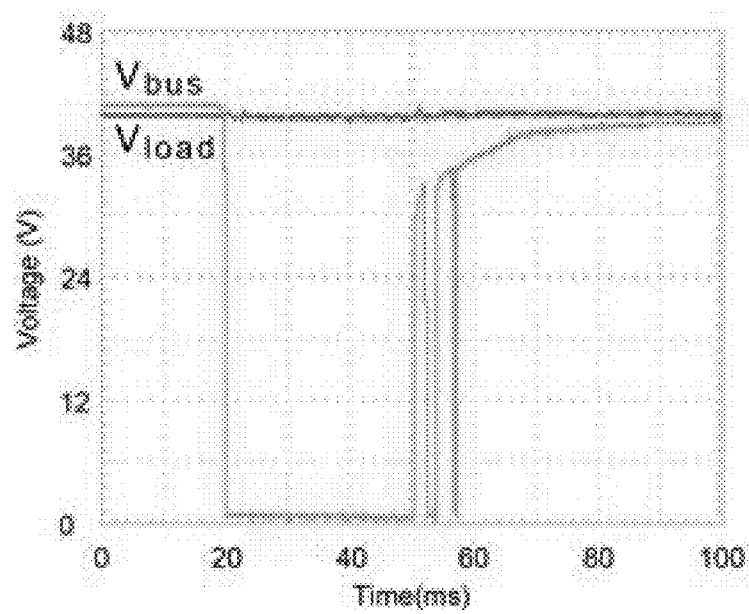
FIG. 14A illustrates a DC bus outage effect on load voltage of line equipped with constant power load (CPL) using a protection circuit with the disclosed method.
Figure 14B:
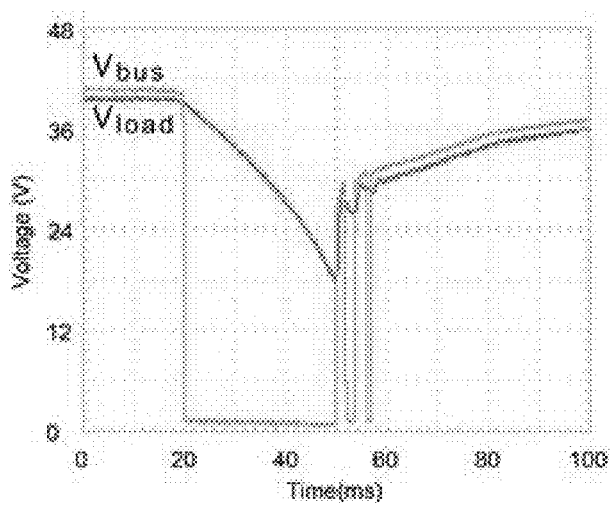
FIG. 14B illustrates a DC bus outage effect on load voltage of line equipped with CPL for an unprotected system.

In an aspect, effect of a DC bus outage (number 3 in FIG. 9) on load voltage of line 1 (which is equipped with a constant power load) is analyzed. In this test, outage duration of 30 ms is applied, which is a typical time needed for fault disconnection and system reconfiguration in most cases of upstream fault protected with the power sequencing approach presented in 0. For fault configuration that require longer reconfiguration time, or for upstream systems relying on slower protection techniques characterized by longer outage duration, required sustainment time can be obtained by properly sizing an input capacitor (e.g., Sw1). Results for this configuration are shown in Error! Reference source not found. Specifically, FIG. 14A illustrates a DC bus outage effect on load voltage of line equipped with CPL for a protected system. FIG. 14B illustrates a DC bus outage effect on load voltage of line equipped with CPL for an unprotected system. A CPL can be characterized at its input by a negative incremental impedance. Being constant power, a decrease in voltage causes an increase in absorbed current, causing the equivalent resistance seen at the input of the load to have a negative incremental characteristic. A voltage decrease can cause an increase in absorbed current, which can lead to increased losses in the line. These increased losses can cause a further decrease in the voltage, which can lead to additional increase in current. This can lead to a destabilizing chain reaction and cause a system collapse.

FIG. 14A show that in the protected system, the load voltage remains constant throughout the duration of the outage and the repowering of DC bus. FIG. 14B show that in the unprotected system, output voltage rapidly decreases, reaching a value that is approximately 60% of the nominal voltage. This value is significantly lower than the normal operating region typically considered in the design of the loads (usually defined as 0.9 VN-1.1 VN). An outage in the unprotected system can cause failure of some loads. For some system configurations, an outrage can cause a negative incremental impedance instability and consequent system failure.

Figure 15B:
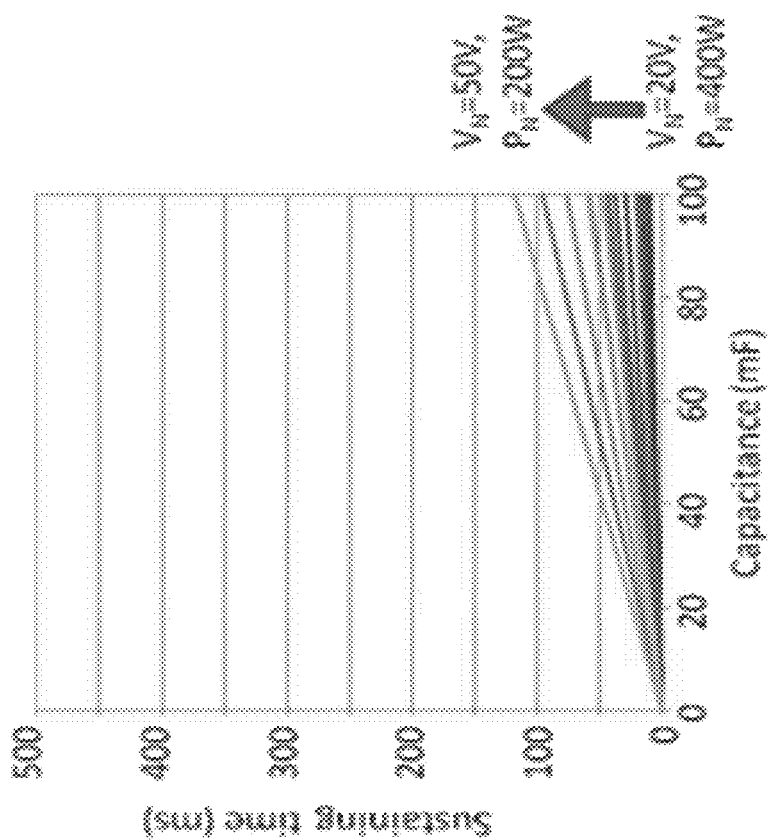
FIG. 15B illustrates a capacitor size vs. sustaining time of a system with a diode holdup capacitor for different values of load voltage and power.
Figure 15A:
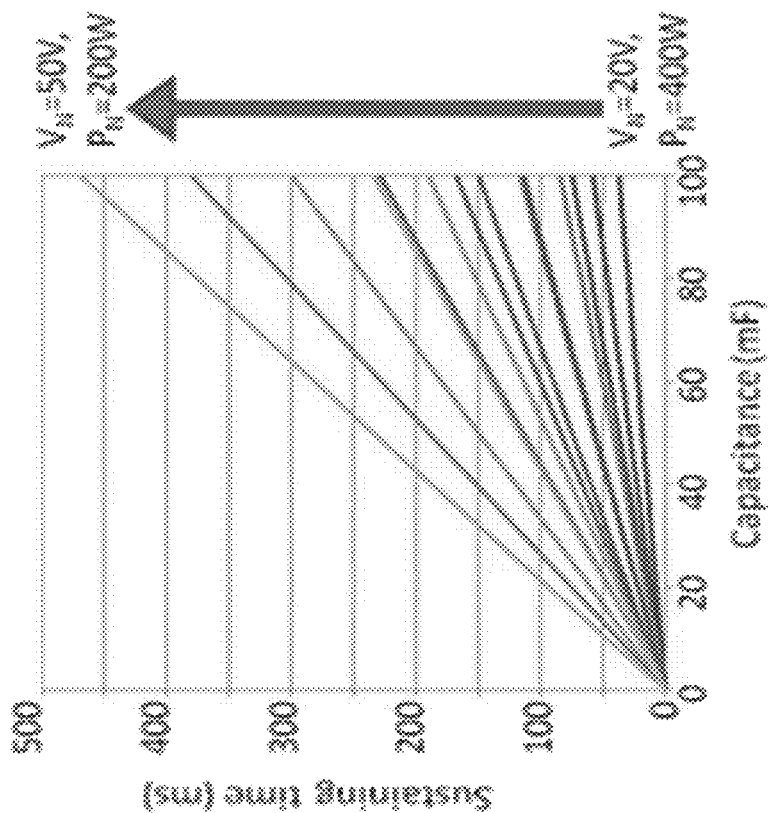
FIG. 15A illustrates a capacitor size vs. sustaining time of a system with a protection circuit controlled with the disclosed method for different values of load voltage and power.

FIG. 15A and FIG. 15B show a comparison between sustaining time (i.e. the time for which the output voltage remains above 90% of the nominal voltage) of a protected system and the sustaining time of the system relying on the combination of decoupling diode and a holdup capacitor, for different values of voltage, power, and installed capacitance.

FIG. 15A shows capacitor size vs. sustaining time of the system with the disclosed controlled protection circuit. FIG. 15B shows capacitor size vs. sustaining time of the system with diode+holdup capacitor, for different values of load voltage and power. It can be seen that at each voltage and power level, for the same installed capacitance, a system protected with the disclosed protection circuit can insure a sustaining time 4 times longer than the system equipped with just a decoupling diode and holdup capacitor. Alternatively, the same sustaining time can be achieved with a capacitor 4 times smaller.

Protection Circuit Behavior in Systems with Redundant Power Source

Figure 16:
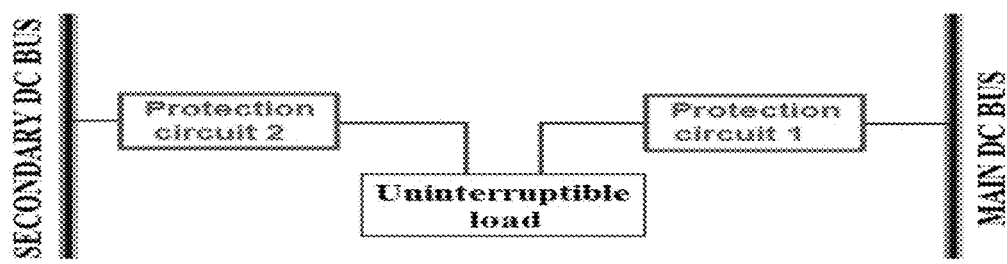
FIG. 16 is a diagram of an example distribution system for uninterruptable loads with redundant power supply.

In certain DC distribution systems, uninterruptible loads can be served from redundant power sources through auctioning diodes. FIG. 16 is a diagram illustrating an example distribution system equipped with disclosed protection circuits for uninterruptable loads with redundant power supply.

Figure 17:
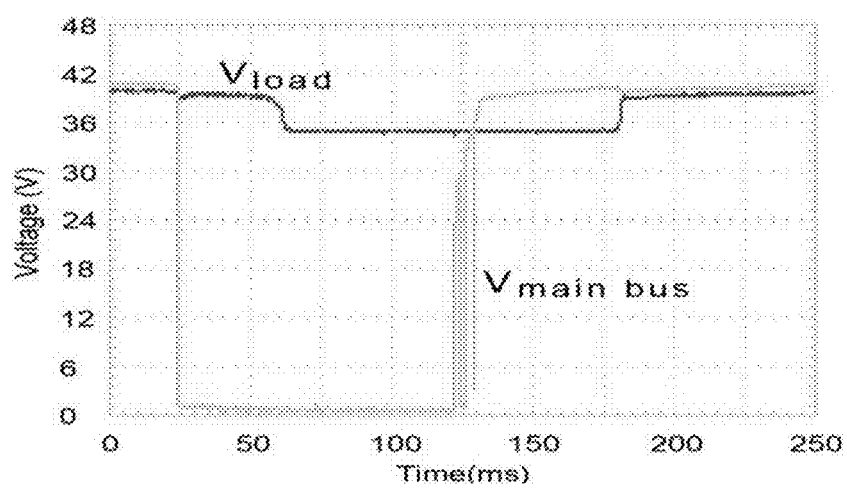
FIG. 17 illustrates a bus outage effect on voltage of uninterruptable load with redundant power source using the disclosed method, in which disconnection is based on a fixed threshold on the output voltage.

In a system with redundant power supplies, a plurality of protection circuits (e.g., protection circuit 1, protection circuit 2) controlled with the disclosed method shown in FIG. 3, for example, disconnection of the buffer mode based on the output voltage dropping below 90% of the nominal voltage, can guarantee protection without interfering with each other as long as the nominal voltage of the secondary DC bus is below the disconnection voltage of the buffer configuration. In this scenario, when an outage occurs on main DC bus, the protection circuit on the main DC bus (protection circuit 1) can work in buffer mode, feeding load at a constant voltage. If the bus is restored before the protection circuit disconnects the load (outage of the main DC bus is within design limits), protection circuit 1 can return to normal operating mode, as it happed for the case with a single feeder, previously shown in FIG. 14A and FIG. 14B. In this scenario, secondary DC bus never feeds a load. If the bus outage is longer than a predefined limit, initially the protection circuit connected to the main DC bus (e.g., protection circuit 1) can work in buffer mode feeding a load at a constant voltage. When an input capacitor of protection circuit 1 is depleted and the controller saturates, the output voltage can start dropping. When output voltage drops below 90% of a nominal voltage, protection circuit 1 can disconnect a load. The output voltage on the load can keep decreasing until it reaches the value of the nominal voltage of the secondary DC bus. At this point, protection circuit 2 (the one connected to the secondary DC bus) can start conducting, feeding the load at the voltage of the secondary DC bus, and monitoring the system for anomalies (outages and sags of the secondary DC bus, or fault on the load side). When main DC bus is restored, protection circuit 1 can turn back on, ramping up its output voltage. The voltage on the load can be restored to its nominal value, and the protection circuit connected to the secondary DC bus (e.g., protection circuit 2) can stop conducting. FIG. 17 illustrates a bus outage effect on voltage of uninterruptable load with redundant power source. In this test, the secondary DC bus has a nominal voltage of 35V, which is lower than 90% of the nominal voltage of the main DC bus (which would be 36V) to ensure disconnection of the protection circuit on the main DC bus after its buffer mode before the secondary line starts conducting.

While the previous case (e.g., two bus at different voltage, a secondary bus fed from battery backup) is a fairly common situation seen in industrial distribution systems, other approaches to supplying uninterruptible loads from redundant power sources can provide specific fractions of power from two different sources, rather than supplying all power either from one bus or the other; in this case, the voltage of the secondary DC bus would be in the same range of the main DC bus. In this situation, if the protection circuits are controlled by a control mechanism in its original form (with the buffer mode disconnection depending on the output voltage dropping below 90% of the nominal voltage), the protection circuits can interfere with each other. The interference can happen because in case of an outage of the main DC bus, the protection circuit connected to the main DC bus would go in buffer mode; its input capacitor would deplete (its controller would saturate), but the protection circuit (e.g., protection circuit 1) would not disconnect a load because the load voltage would be sustained by the secondary DC bus and consequently can never drop below 90% of the nominal voltage required by the controller of the protection circuit (e.g., protection circuit 1) of the main DC bus to disconnect the load. A controller of the protection circuit (e.g., protection circuit 1) connected on the main DC bus would saturate but not turn off, and this can cause problems when the power on the main DC bus is restored. Specifically, the controller would still be in buffer mode when the main DC bus is restored, and this might cause a peak in the output voltage.

In order to avoid interferences, the method presented in FIG. 3 can be modified to be used for control of protection circuits used for systems with redundant power sources. In this modified version of the method, the disconnection of a protection circuit after buffer mode is based on saturation of a controller rather than on the output voltage. For example, a controller can turn its output off when the buffer has reached the duty cycle limit. Using this modified method, a plurality of protection circuits feeding the uninterruptible load from the two power sources would guarantee protection without interfering with each other independently from the nominal voltage of the secondary DC bus. Different scenarios could appear in the system depending on the nominal voltage of the secondary DC bus.

Case A: secondary DC bus with a nominal voltage lower than the output reference voltage of protection circuit 1 (e.g., the protection circuit connected to the main DC bus).

Figure 18A:
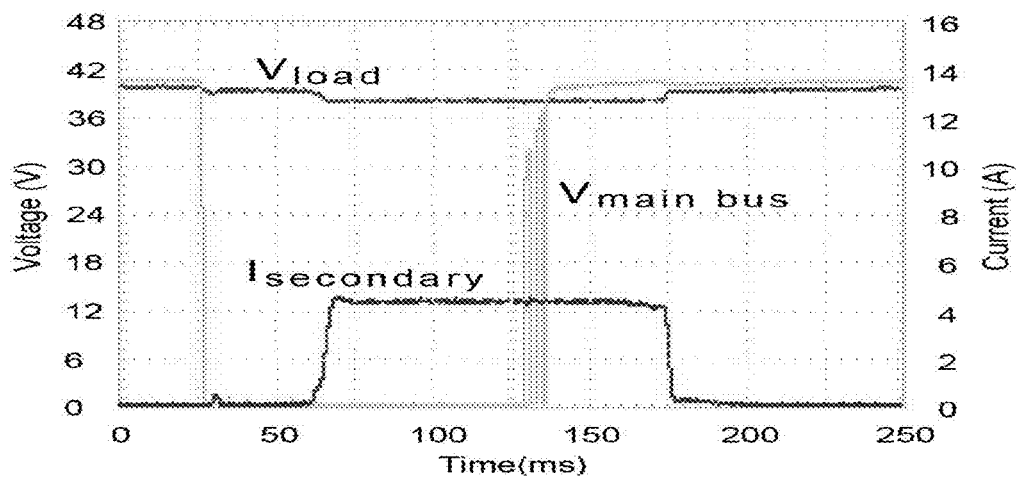
FIG. 18A illustrates main DC bus outage effect on load voltage and secondary DC bus current, for nominal voltage of secondary DC bus lower than protection circuit 1 buffer reference, using a modified method for systems with redundant power supplies.

In this case the protection circuit on the main DC bus (protection circuit 1 in FIG. 16) can buffer full load energy until its controller saturates. If the outage on the main DC bus is cleared before the controller saturates, protection circuit 1 can return to its normal operating mode, as it happened for the single feeder case illustrated in FIG. 14A. In this case, the secondary DC bus can never feed a load. If the main DC bus outage is longer than the design limit, once a controller of protection circuit 1 has saturated, it can disconnect its output, and the secondary DC bus can start feeding the load, therefor, protection circuit 2 can start conducting. Once voltage on the main DC bus is restored, protection circuit 1 can ramp up its output voltage and restart feeding the load, discharging the secondary DC bus. FIG. 18A illustrates main DC bus outage effect on load voltage and secondary bus current, for nominal voltage of secondary bus lower than protection circuit 1 buffer reference.

Figure 18B:
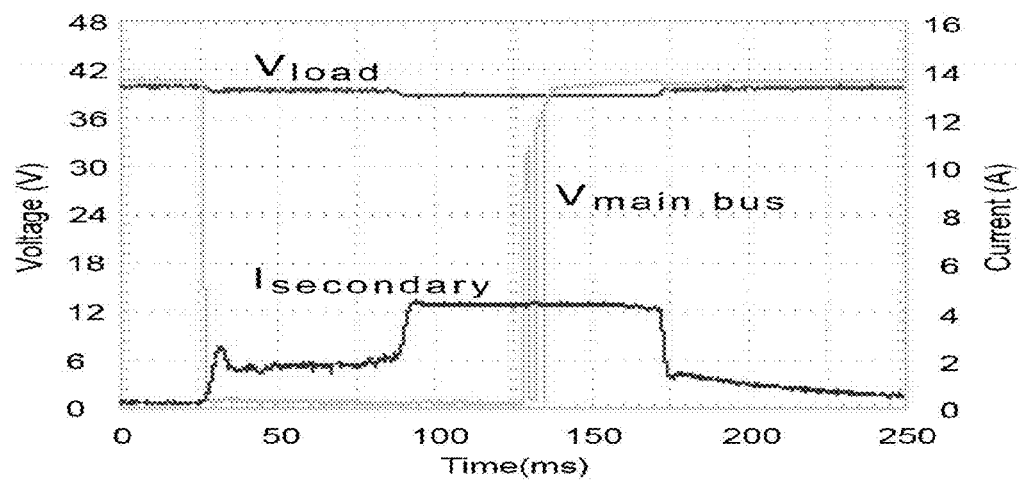
FIG. 18B illustrates main DC bus outage effect on load voltage and secondary DC bus current, for secondary DC bus nominal voltage equal to protection circuit 1 buffer voltage reference using a modified method for systems with redundant power supplies.

In this scenario, when the outage occurs on main DC bus, protection circuit 1 will implement buffer mode. Being the output voltage reference of protection circuit 1 equal to the nominal voltage of the secondary DC bus, the protection circuit connected to the secondary DC bus (protection circuit 2 in FIG. 16) can start conducting. At this point, the two protection circuits (e.g., protection circuit 1 and protection circuit 2) can be simultaneously feeding the load (protection circuit 2 from the secondary DC bus, and protection circuit 1 by buffering the energy accumulated in its input capacitor). The two protection circuits can share energy feed to a load until protection circuit 1 turns off, for example, when input capacitor of the protection circuit 1 depletes, a controller of the protection circuit 1 saturates and disconnects output. At that point, all the energy to a load can be supplied by the secondary DC bus, until the main DC bus is restored and protection circuit 1 returns to normal operating mode. In this scenario, all the energy to the load can be supplied by the main DC bus again, disconnecting the secondary feed. This scenario is shown in FIG. 18B. FIG. 18B illustrates main DC bus outage effect on load voltage and secondary DC bus current, for secondary bus nominal voltage equal to protection circuit 1 buffer voltage reference.

Figure 19A:
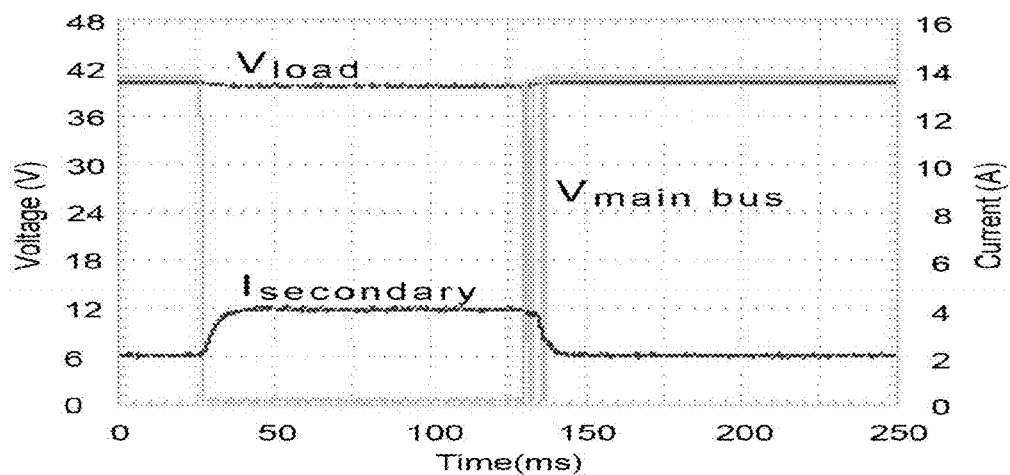
FIG. 19A illustrates main DC bus outage effect on load voltage and secondary DC bus current, for secondary DC bus nominal voltage higher than protection circuit 1 buffer voltage reference, but not higher than main DC bus nominal voltage, using a modified method for systems with redundant power supplies.
Figure 19B:
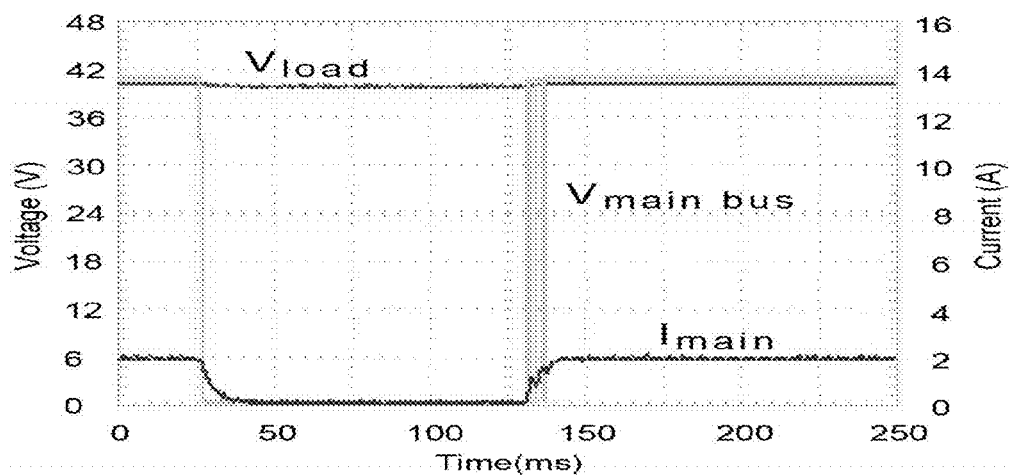
FIG. 19B illustrates main DC bus outage effect on load voltage and main DC bus current, for main DC bus nominal voltage higher than protection circuit 1 buffer voltage reference, but not higher than main DC bus nominal voltage, using a modified method for systems with redundant power supplies.

Case C: Secondary DC bus nominal voltage higher than the output reference voltage of protection circuit 1, but not higher than main DC bus nominal voltage. In this case, the protection circuit (e.g., protection circuit 1) connected to the main DC bus never operates in buffer mode (except in case the secondary DC bus is depowered). During normal operation, the two protection circuits (e.g., protection circuit 1 and protection circuit 2) can share energy feed to a load. When an outage occurs on the main DC bus, the voltage on the input capacitor of protection circuit 1 can quickly drop at the output voltage level, which can be sustained by the secondary DC bus and therefore it is still higher than the output voltage reference of protection circuit 1. Consequently, protection circuit 1 doesn't buffer energy from its input capacitor and all load power is fed from the secondary DC bus through protection circuit 2. When the main DC bus is repowered, protection circuit 1 returns to normal operating mode and restart feeding the load (still sharing the load energy feed with the secondary DC bus). This scenario is shown in FIG. 19A and FIG. 19B. Specifically, FIG. 19A illustrates main DC bus outage effect on load voltage and secondary bus current, for secondary bus nominal voltage higher than protection circuit 1 buffer voltage reference, but not higher than main bus nominal voltage. FIG. 19B illustrates main DC bus outage effect on load voltage and main bus current, for main bus nominal voltage higher than protection circuit 1 buffer voltage reference, but not higher than main bus nominal voltage.

It can be seen, FIG. 18A, FIG. 18B, FIG. 19A and FIG. 19B illustrates various results with the method modified for system with redundant power supplies. Specifically, disconnection is not based on output voltage but rather on saturation of the controller in buffer mode.

Case D: Secondary DC Bus Nominal Voltage Higher than Main DC Bus Nominal Voltage In this scenario, the protection circuit (e.g., protection circuit 1) connected to the main DC bus never feeds the load. All the power to the load is fed from the secondary DC bus unless there is an outage on the secondary DC bus. In this configuration, the secondary DC bus can work as main DC bus, while the main DC bus works as emergency redundant power supply. For systems with uninterruptible loads served from redundant power sources, in case of power outage in one of a plurality of buses, the disclosed protection circuits can be appropriately controlled to ensure good system performance and no interference between protection circuits.

This analysis has been performed considering a complete bus outage (i.e. the bus voltage of the main DC bus drops to zero). The same consideration can be done for the case of voltage sag on the main DC bus, but some additional considerations need to be done. In "Case C" and "Case D" presented before, since the controller of protection circuit 1 doesn't implement the buffer mode, both protection circuits can operate without interferences. In "Case A" and "Case B", when a voltage sag happens on the main DC bus, its protection circuit can implement a buffer mode, and remain in buffer mode until the bus is restored, or the controller saturates, or a negative incremental impedance instability is detected. During a voltage sag, if the main DC bus voltage doesn't decrease below the minimum buffer voltage, the controller can not saturate and consequently it cannot disconnect a load. Therefore, in a system with this topology (secondary DC bus feeding the uninterruptible load), if the voltage sag on the main DC bus isn't big enough to cause the buffer to saturate and no instability is detected, the protection circuit connected to the main DC bus can operate in buffer mode until the bus is restored. If the voltage sag is characterized by a long duration, the protection circuit can operate in buffer mode for long time. If the protection circuit operates in buffer mode for too long, it can cause excessive heating of the switching components and potential damages to the protection circuit. In order to avoid this problem, a maximum time limit for the buffer operating mode can be implemented. For example, if the bus is not restored within a predefined time limit, a controller can disconnect a load.

Voltage Sag-Negative Incremental Impedance Instabilities

Figure 20A:
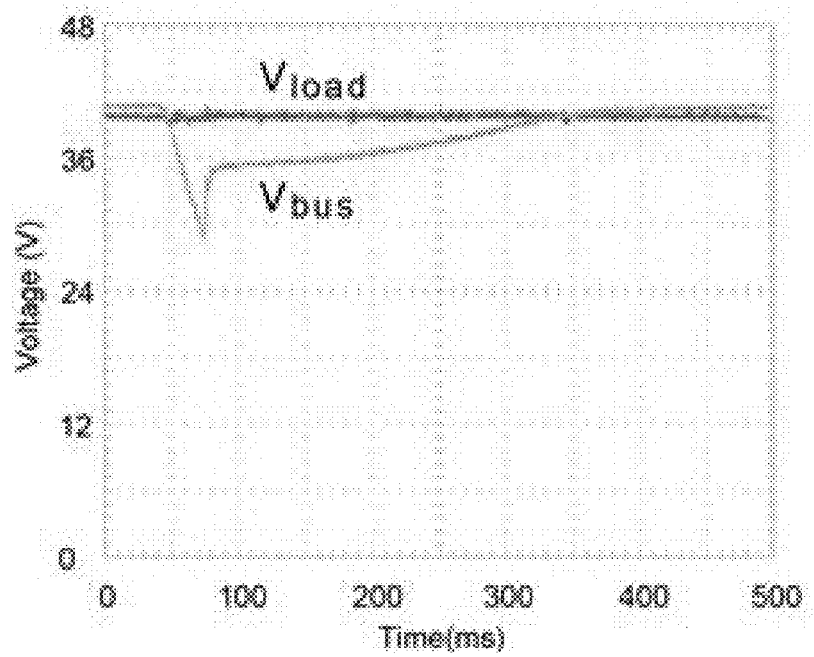
FIG. 20A illustrates behavior of a protected system during a voltage sag on a DC bus.
Figure 20B:
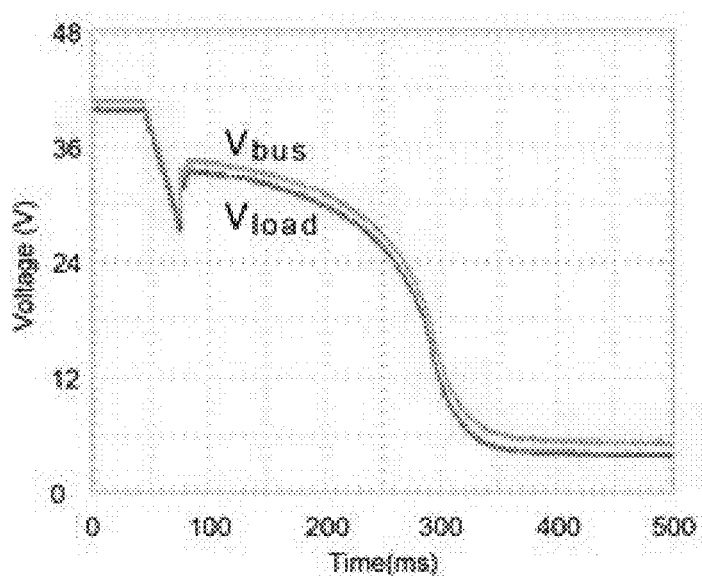
FIG. 20B illustrates behavior of an unprotected system during a voltage sag on a DC bus.

FIG. 20A illustrates behavior of a protected system during a voltage sag on a DC bus. FIG. 20B illustrates behavior of an unprotected system during a voltage sag on a DC bus. For the protected system, the output voltage stays constant during a voltage sag. When the voltage sag is removed, the input voltage can start ramping up and eventually returns to the nominal value. The speed at which the input voltage returns to the nominal value depends on the difference between an upstream converter current limit and the current allowed by the protection circuit controller to be fed to the load (which depends on the equivalent input resistance set for the protection in this configuration). In the unprotected system, the output voltage drops together with the input voltage. When the voltage sag is cleared, output voltage can be significantly smaller than its nominal value, which entails that the constant power load requires a current significantly higher than the nominal current. This causes the upstream converter to go in current limiting mode, and consequently a collapse in the bus voltage and system failure.

Figure 21A:
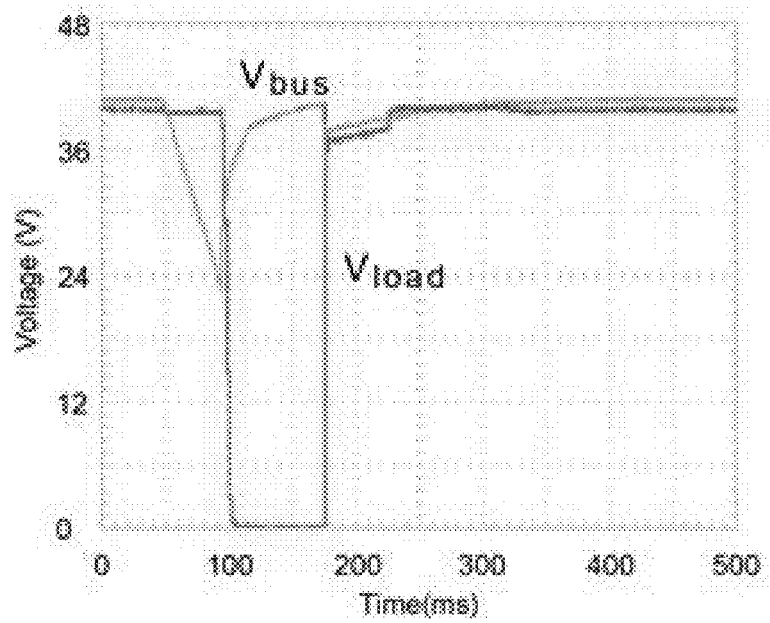
FIG. 21A illustrates behavior of a protected system during a voltage sag on a DC bus.
Figure 21B:
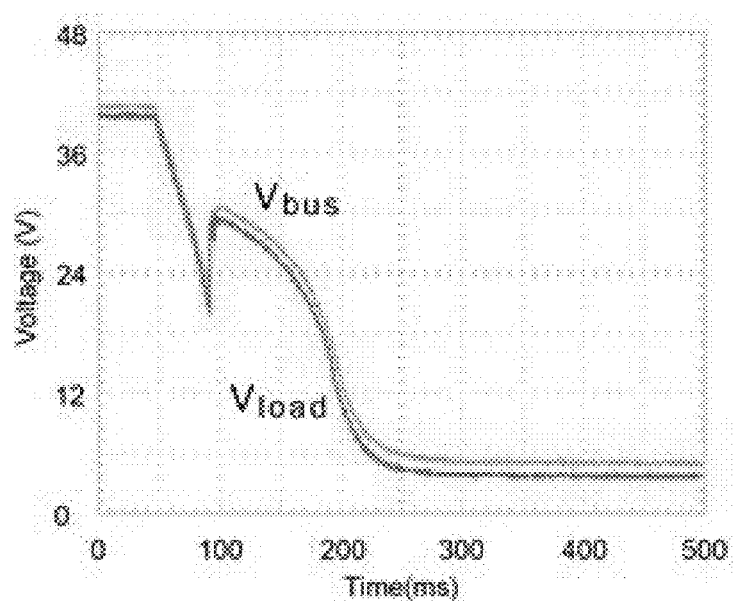
FIG. 21B illustrates behavior of an unprotected system during a voltage sag on a DC bus.

In case of voltage sags bigger than a predefined limit, a protection circuit cannot provide the energy gap required by the load, a controller of the protection circuit can force the protection circuit to disconnect a constant power load before it causes negative incremental impedance instability, avoiding system failure. Once the bus voltage reenergizes and returns to its nominal value, the controller can reactivate the protection circuit and reconnect the constant power load. FIG. 21A illustrates behavior of a protected system during another voltage sag on a DC bus. FIG. 21B illustrates behavior of an unprotected system during another voltage sag on a DC bus. Bus voltage collapses faster in the unprotected system than in the protected system.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications are referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

REFERENCES

[1] A. Griffo, J. Wang and D. Howe, "Large Signal Stability Analysis of DC Power Systems with Constant Power Loads", Vehicle Power and Propulsion Conference (VPPC), Sep. 3-5, 2008, Harbin, China

[2] M. Valdes, T. Papallo, B. Premerlani, Ground Fault Location in Low-Voltage High-Resistance Grounded Systems via the Single-Processor Concept for Circuit Protection. Pulp and Paper Industry Technical Conference, 2006. Conference Record of Annual, pp. 1-8, 18-23 Jun. 2006.

[3] Y. Pan, P. M. Silveira, M. Steurer. T. L. Baldwin and P. F. Ribeiro, "A Novel Approach to Fault Location in Ungrounded DC Shipboard Power Distribution Systems," 2007 Automation and Control Conference, Biloxi, Miss., Dec. 10-11, 2007.

[4] U. Ghisla, I. Kondratiev, R. A. Dougal, "Branch Circuit Protection for DC Systems", IEEE Electric Ship Technology Symposium (ESTS), 2011. Publication Year: 2011, Page(s): 234-239.

[5] P. Cairoli, R. A. Dougal, U. Ghisla, I. Kondratiev, "Power sequencing approach to fault isolation in dc systems: Influence of system parameters" IEEE Energy Conversion Congress and Exposition (ECCE), 2010. Publication Year: 2010, Page(s): 72-78

[6] J. Tucker, D. Martin, R. Mersenski, A. Barkley, P. Cairoli. U. Ghisla, A. Riccobono, R. Dougal, E. Santi, "Fault Protection and Ride-Through Scheme for MVDC Power Distribution Systems Utilizing a Supervisory Controller" IEEE Electric Ship Technology Symposium (ESTS), 2011. Publication Year: 2011, Page(s): 319-325

[7] C. Holsonback, T. Webb, T. Kiehne, C. Scepersad, "System-Level Modeling and Optimal Design of an All-Electric Ship Energy Storage Module", ASNE Electric Machine Technology Symposium, Philadelphia, Pa., 2006, May.

[8] R. Singh, B. C. Pal, and R. A. Jabr, "Statistical representation of distribution system loads using Gaussian mixture model," IEEE Transactions on Power Systems, vol. 25, no. 1, pp. 29-37, February 2010.

What is claimed is:

1. A method for controlling at least one protection circuit, wherein the at least one protection circuit comprises a plurality of switches, wherein the plurality of switches comprises five or more switches, wherein a first switch is connected between a positive input terminal of the at least one protection circuit and a positive input terminal of an input capacitor, a second switch is connected between a positive terminal of an input capacitor and an input terminal of an inductor, a third switch is connected between the input terminal of the inductor and a ground potential, a fourth switch is connected between an output terminal of the inductor and the ground potential, and a fifth switch is connected between the output terminal of the inductor and an output terminal of the at least one protection circuit, the method comprising:

monitoring one or more parameters of the at least one protection circuit, wherein the at least one protection circuit functions as one or more switching converters;

selectively providing one or more control signals to the plurality of switches in the protection circuit based on one or more parameters of the at least one protection circuit, wherein the one or more parameters comprise one or more of input current, output voltage, input capacitor voltage, output capacitor voltage, output current, and inductor current of the at least one protection circuit; and wherein selectively providing one or more control signals to the plurality of switches in the at least one protection circuit based on the one or more parameters of the at least one protection circuit comprises providing one or more control signals to close the first switch and the fifth circuit, open the fourth switch, and switch the second switch and the third switch when the inductor current is outside a predefined range to in order to limit the inductor current to a predefined inductor current value.

2. The method of claim 1, further comprising: providing one or more control signals to open the second switch and close the third switch in order to drive the inductor current to zero if the inductor current is beyond the predefined inductor current value for over a predefined period of time.

3. The method of claim 1, wherein the at least one protection circuit further comprises one or more sensors configured to monitor the one or more parameters of the at least one protection circuit.

4. The method of claim 1, wherein the one or more parameters of the at least one protection circuit is obtained via one or more voltage sensors and one or more current sensors.

5. The method of claim 1, wherein the at least one protection circuit is connected between a DC distribution system and a load.

6. The method of claim 1, wherein the at least one protection circuit is coupled between a main DC distribution system and a secondary DC distribution system, and wherein the one or more control signals are selectively provided to the at least one protection circuit independently.

7. A method comprising:
monitoring one or more parameters of the at least one protection circuit, wherein the at least one protection circuit functions as one or more switching converters, and wherein the at least one protection circuit comprises a decoupling switch, an input capacitor, a buck converter, and a boost converter connected in cascade, wherein the decoupling switch is a first switch, the input capacitor is coupled across an input terminal of the at least one protection circuit and a ground potential, and wherein the buck converter comprise a second switch connected to a inductor, a third switch coupled across between the ground potential and a connection point between the second switch and the inductor, and wherein the boost converter comprises the inductor, a fourth switch, a fifth switch and an output capacitor, wherein the fifth switch is connected between the inductor and an output terminal of the at least one protection circuit, and wherein the fourth switch is coupled across the ground potential and a connection point between the inductor and the fifth switch, and wherein the output capacitor is coupled between the output terminal of the at least one protection circuit and the ground potential;
selectively providing one or more control signals to the five switches in the protection circuit based on one or more parameters of the at least one protection circuit, wherein the one or more parameters comprise one or more of input current, output voltage, input capacitor voltage, output capacitor voltage, output current, and inductor current of the at least one protection circuit; and
wherein selectively providing one or more control signals to the five switches in the at least one protection circuit based on the one or more parameters of the at least one protection circuit comprises providing one or more control signals to close the first switch and the fifth circuit, open the fourth switch, and switch the second switch and the third switch when the inductor current is outside a predefined range to in order to limit the inductor current to a predefined inductor current value.

8. The method of claim 7, further comprising: providing one or more control signals to open the second switch and close the third switch in order to drive the inductor current to zero if the inductor current is beyond the predefined inductor current value for over a predefined period of time.

9. An apparatus comprising:
a protection circuit, wherein the protection circuit comprises a plurality of switches, wherein the plurality of switches is five or more switches, wherein a first switch is connected between a positive input terminal of the at least one protection circuit and a positive input terminal of an input capacitor, a second switch is connected between a positive terminal of an input capacitor and an input terminal of an inductor, a third switch is connected between the input terminal of the inductor and a ground potential, a fourth switch is connected between an output terminal of the inductor and the ground potential, and a fifth switch is connected between the output terminal of the inductor and an output terminal of the at least one protection circuit;
a controller, wherein the controller is configured for selectively providing one or more control signals to the plurality switches in the protection circuit based on one or more parameters of the at least one protection circuit, wherein the one or more parameters comprise one or more of input current, output voltage, input capacitor voltage, output capacitor voltage, output current, and inductor current of the at least one protection circuit;
wherein selectively providing one or more control signals to the five switches in the protection circuit based on the one or more parameters of the protection circuit comprises providing one or more control signals to close the first switch when the input voltage is below a predefined input voltage value and above the input capacitor voltage; and
providing one or more control signals to close the second switch, open the third switch, and switch the fourth switch and the fifth switch when the ratio of the input voltage and the input current is over a predefined value.

10. A method for controlling at least one protection circuit, wherein the at least one protection circuit comprises a plurality of switches, wherein the plurality of switches comprises five or more switches, wherein a first switch is connected between a positive input terminal of the at least one protection circuit and a positive input terminal of an input capacitor, a second switch is connected between a positive terminal of an input capacitor and an input terminal of an inductor, a third switch is connected between the input terminal of the inductor and a ground potential, a fourth switch is connected between an output terminal of the inductor and the ground potential, and a fifth switch is connected between the output terminal of the inductor and an output terminal of the at least one protection circuit, the method comprising:
monitoring one or more parameters of the at least one protection circuit, wherein the at least one protection circuit functions as one or more switching converters;
selectively providing one or more control signals to the plurality of switches in the protection circuit based on one or more parameters of the at least one protection circuit, wherein the one or more parameters comprise one or more of input current, output voltage, input capacitor voltage, output capacitor voltage, output current, and inductor current of the at least one protection circuit;
wherein selectively providing one or more control signals to the five switches in the protection circuit based on the one or more parameters of the protection circuit comprises providing one or more control signals to close the first switch when the input voltage is below a predefined input voltage value and above the input capacitor voltage; and providing one or more control signals to close the fifth switch, open the fourth switch, and switch the second switch and the third switch when the ratio of the input voltage and the input current is below a predefined value.

\* \* \* \* \*